United States Patent
Chandrupatla et al.

(10) Patent No.: US 7,529,826 B2
(45) Date of Patent: *May 5, 2009

(54) SHARING OF NAS INFORMATION BETWEEN POPS

(75) Inventors: Anil Kumar Chandrupatla, Milpitas, CA (US); Sunil Kumar Chandrupatla, San Jose, CA (US); Kali Prasanna Mishra, San Jose, CA (US); Sunil Kumar Podar, Sunnyvale, CA (US); Sampath Kumar Sthothra Bhasham, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 681 days.

This patent is subject to a terminal disclaimer.

(21) Appl. No.: 11/077,597

(22) Filed: Mar. 10, 2005

(65) Prior Publication Data

US 2005/0198294 A1    Sep. 8, 2005

Related U.S. Application Data

(63) Continuation of application No. 09/477,021, filed on Jan. 3, 2000, now Pat. No. 6,895,434.

(51) Int. Cl.
G06F 15/173    (2006.01)
G06F 15/16    (2006.01)
H04Q 7/20    (2006.01)

(52) U.S. Cl. .................. 709/223; 709/217; 709/224; 709/225; 455/432.1; 455/433; 455/435.1; 455/436

(58) Field of Classification Search ................ 709/217, 709/224, 225; 455/432.1, 433, 435.1, 436
See application file for complete search history.

(56) References Cited

U.S. PATENT DOCUMENTS 4,763,191 A * 8/1988 Gordon et al. ............... 725/104

(Continued)

FOREIGN PATENT DOCUMENTS

EP        0 567 217 A2    10/1993

(Continued)

OTHER PUBLICATIONS

"Access Control Product Information", Ascend Communications, Inc., 4 pages.

(Continued)

*Primary Examiner*—Ario Etienne
*Assistant Examiner*—Sargon N Nano
(74) *Attorney, Agent, or Firm*—Thelen LLP; David B. Ritchie (57)    ABSTRACT

A method for handling access requests at multiple PoPs using the sharing of NAS information between the PoPs, enabling each PoP to maintain its own, independent, database of user records. When an access request is received, it is forwarded to a specific PoP designated as the user's "home PoP". This home PoP is the only PoP to contain the user's records. The home PoP may then handle the access request by utilizing a local NAS list, the local NAS list being synchronized with other NAS lists in the network and providing information on all the "known" NASes throughout the entire network. This allows for a user to roam between PoPs, while reducing the bandwidth and security concerns that have existed in the past when users chose to roam. The NAS lists may then be updated via a central Network Control Console.

21 Claims, 5 Drawing Sheets

U.S. PATENT DOCUMENTS

| | | | | |
|---|---|---|---|---|
| 4,922,486 | A | * 5/1990 | Lidinsky et al. | 370/427 |
| 4,962,497 | A | * 10/1990 | Ferenc et al. | 370/354 |
| 5,003,595 | A | 3/1991 | Collins et al. | 380/25 |
| 5,241,594 | A | 8/1993 | Kung | 380/4 |
| 5,241,599 | A | 8/1993 | Bellovin et al. | 380/21 |
| 5,351,136 | A | 9/1994 | Wu et al. | 358/440 |
| 5,367,635 | A | 11/1994 | Bauer et al. | 395/200 |
| 5,416,842 | A | 5/1995 | Aziz | 380/30 |
| 5,423,002 | A | 6/1995 | Hart | 395/200 |
| 5,440,635 | A | 8/1995 | Bellovin et al. | 380/25 |
| 5,610,910 | A | 3/1997 | Focsaneanu et al. | 370/351 |
| 5,621,721 | A | 4/1997 | Vatuone | 370/16 |
| 5,655,077 | A | 8/1997 | Jones et al. | 395/187.01 |
| 5,668,857 | A | 9/1997 | McHale | 379/93.07 |
| 5,671,354 | A | 9/1997 | Ito et al. | 395/187.01 |
| 5,684,950 | A | 11/1997 | Dare et al. | 395/187.01 |
| 5,809,422 | A | 9/1998 | Raleigh et al. | 455/449 |
| 5,815,665 | A | 9/1998 | Teper et al. | 395/200.59 |
| 5,835,727 | A | 11/1998 | Wong et al. | 395/200.68 |
| 5,838,683 | A | 11/1998 | Corley et al. | 370/408 |
| 5,845,070 | A | 12/1998 | Ikudome | 395/187.01 |
| 5,898,780 | A | 4/1999 | Liu et al. | 380/25 |
| 5,944,824 | A | 8/1999 | He | 713/201 |
| 5,987,232 | A | 11/1999 | Tabuki | 395/187.01 |
| 5,991,810 | A | 11/1999 | Shapiro et al. | 709/229 |
| 5,991,828 | A | 11/1999 | Horie et al. | 710/8 |
| 6,006,334 | A | 12/1999 | Nguyen et al. | 713/202 |
| 6,009,103 | A | 12/1999 | Woundy | 370/401 |
| 6,011,910 | A | 1/2000 | Chau et al. | 395/200.59 |
| 6,012,088 | A | 1/2000 | Li et al. | 709/219 |
| 6,018,770 | A | 1/2000 | Little et al. | 709/223 |
| 6,021,496 | A | 2/2000 | Dutcher et al. | 713/202 |
| 6,026,441 | A | 2/2000 | Ronen | 709/227 |
| 6,047,376 | A | 4/2000 | Hosoe | 713/201 |
| 6,070,192 | A | 5/2000 | Holt et al. | 709/227 |
| 6,091,951 | A | 7/2000 | Sturniolo et al. | 455/432 |
| 6,092,178 | A | 7/2000 | Jindal et al. | 712/27 |
| 6,092,196 | A | 7/2000 | Reiche | 713/200 |
| 6,119,160 | A | 9/2000 | Zhang et al. | 709/224 |
| 6,141,687 | A | 10/2000 | Blair | 709/225 |
| 6,377,982 | B1 | 4/2002 | Rai et al. | 709/217 |
| 6,400,722 | B1 | 6/2002 | Chuah et al. | 370/401 |
| 6,442,169 | B1 | 8/2002 | Lewis | 370/401 |

FOREIGN PATENT DOCUMENTS

| | | |
|---|---|---|
| WO | 99/53408 | 10/1999 |

OTHER PUBLICATIONS

Active Software, Inc., "Active Software's Integration System", printed from http://www.activesw.com/products/products.html, on Jul. 24, 1998.

Bellovin, Steven M., "Problem Areas for the IP Security Protocols", Jul. 22-25, 1996, Proceedings of the Sixth Usenix UNIX Security Symposium, San Jose, CA.

Bracho, Dr. Rafael, "Integrating the Corporate Computing Environment with Active Software", Nov. 18, 1998, Active Software, Inc., pp. 1-17.

Bracho, Dr. Rafael, "Mastering Corporate Computing with the ActiveWeb System", 1996, Active Software, Inc.

Carrel, D. et al., "The TACACS+ Protocol, Version 1.78", Cisco Systems, Inc., printed from ftp://ftp-eng.cisco.com/edweber/tac-rfc.1.78.txt on Oct. 23, 2000.

IBM, "IBM introduces new subscriber management system for Internet service providers", Dec. 2, 1998, IBM News, p. 1.

MultiVPN from Ascend Communications: "Breaking Down the Barriers to VPNs", Ascend Communications, Inc., White Paper, 1998.

"Remote Access Network Security", Ascend Communications, Inc., printed from http://www.ascend.com/1103.html, on Jul. 24, 1998, pp. 1-8.

Rigney, et al., "Remote Authentication Dial In User Service (RADIUS)", Network Working Group, RFC 2138, Apr. 1997, pp. 1-57.

* cited by examiner

SHARING OF NAS INFORMATION BETWEEN POPS

CROSS-REFERENCE TO RELATED APPLICATION

This application is a continuation of application Ser. No. 09/477,021, entitled "SHARING OF NAS INFORMATION BETWEEN POPS" by Anil Chandrupatla, Sunil Chandrupatla, Kali Mishra, Sunil Podar and Sampath Sthothra Bhasham, filed on Jan. 3, 2000 now U.S. Pat. No. 6,895,434.

BACKGROUND OF THE INVENTION

1. Field of the Invention

The present invention relates to Points of Presence (PoPs). More particularly, the present invention relates to the sharing of Network Access Server (NAS) information between PoPs in order to more effectively handle user roaming.

2. The Background

Figure 1:
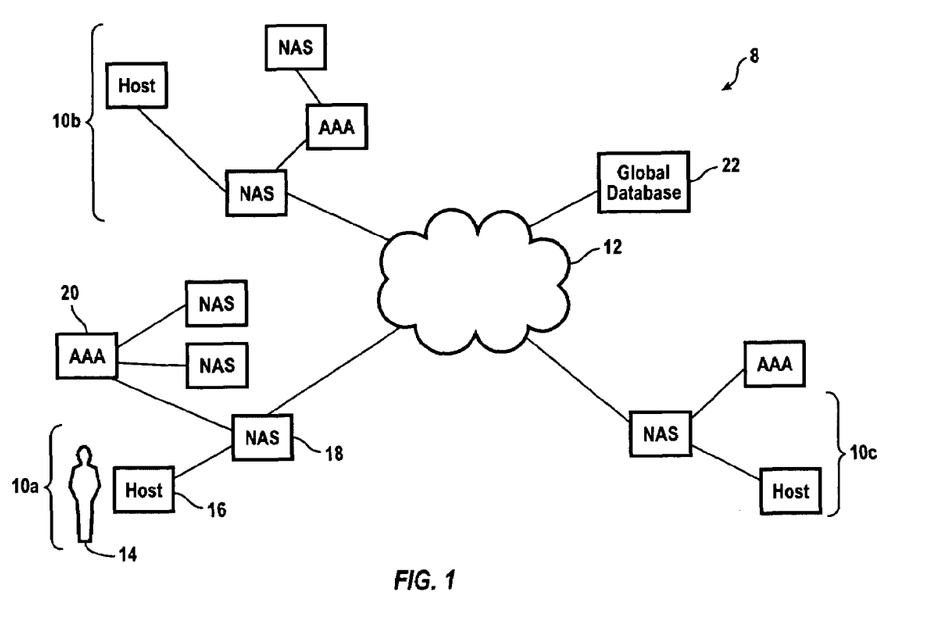
FIG. 1 is a schematic diagram of a one type of a communications system having a central database storing all the user records for supporting access requests processed by more than one access point.

Turning to FIG. 1, one approach for providing network access to a communications system 8 over an access point (such as access point 10a, access point 10b, or access point 10c) using a communications network 12 is shown. An access point is associated with a set of service components and at least one client, enabling a subscriber 14 using a host machine 16, such as a personal computer having a modem, to obtain access to system 8. As known to those of ordinary skill in the art, when referred to in the context of the Internet or other large computer networks, each client coupled to an access point provides connectivity to hosts within an area commonly referred to as a PoP or "Point of Presence." A PoP is a geographical area that is serviced by an access point, which is typically managed by an ISP ("Internet Services Provider"). For dial-up access methods using a public switched telephone network (PSTN), the geographical area may be defined by an area code.

For example, if network 12 is implemented using the Internet, access point 10a may be configured to support subscribers within a geographical area defined by a first area code, such as that covering San Jose, Calif., while access point 10b may be configured to support subscribers within another geographical area defined by a second area code, such as that covering San Francisco, Calif. and/or its surrounding cities and towns. Similarly, access point 10c may be configured to support subscribers within a geographical area defined by a third area code, such as that covering New York City, N.Y.

For dial-up access to network 12, each access point includes at least one network access server (commonly referred to as a NAS), such as network access server 18. Network access server (NAS) 18 functions as an interface between host machine 16 (via the modem) and the necessary services which must be provided when subscriber 14 seeks to obtain network access using a dial access method. Each PoP may contain one or more NASes. Responding to a dial-up access request typically includes the process steps (sometimes referred to as "states") of authentication, authorization, and accounting. These states may be provided by an Authentication, Authorization, and Accounting (AAA) server, such as AAA server 20. AAA server 20 uses the RADIUS protocol to communicate with devices, such as network access server 18, which request authentication, authorization, and accounting services.

To provide authentication, authorization, and accounting services properly, an AAA server requires access to a database 22 having a set of user records. The user records are then accessed during authentication, authorization, and/or accounting. For a communications system that has more than one access point, such as communications system 8, database 22 may be maintained as a central database that contains all of the user records required by all of the access points in communications system 8. This provides the advantages of maintaining only one database for more than one access point, reducing the complexity of the system, while permitting a subscriber to obtain network access at an access point other than his originating access point (commonly referred to as "roaming").

For example, if access point 10a is the home access point for subscriber 14, subscriber 14 may still dial-up a different access point, even if the access point is at a different geographical area, such as access point 10c. This is possible because access point 10c has access to the user record corresponding to subscriber 14 by virtue of database 22.

However, centrally locating a database is expensive with respect to network bandwidth consumption because each database transaction generated for every access request that requires AAA services from an access point in communications system 8 must be sent to database 22 (sometimes referred to as "back-hauling"). Moreover, this problem of bandwidth consumption increases and becomes more acute during peak use hours.

Back-hauling also requires an entry for each NAS in the AAA server database, because the AAA server database must authenticate the NAS from which the user is accessing the network.

Figure 2:
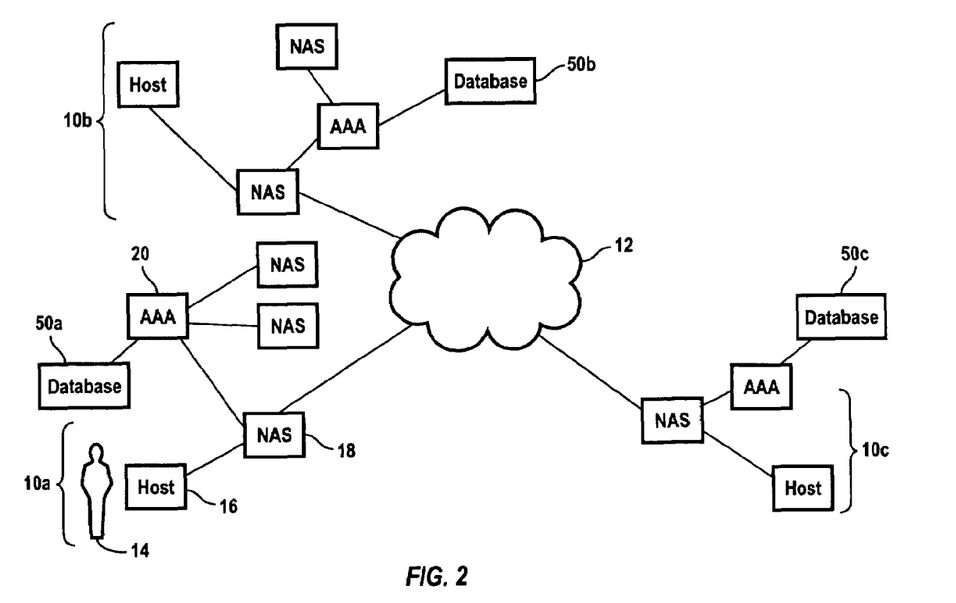
FIG. 2 is a schematic diagram of a communications system having a local database storing all the user records for supporting access requests at each access point.

Another solution involves implementing a local database at each access point. This case is illustrated in FIG. 2. Each database 50a, 50b, 50c contains a complete set of user records. This allows a user to easily roam, as the user's record is accessible from any of the NASes. However, this solution offers the challenges of having to maintain synchronicity with other local databases. Each time a user's record is changed, added, or removed, all the local databases must be updated.

It is also becoming more common for ISPs to enter into partnership or "roaming" agreements with other ISPs to provide access to each other's subscribers. This type of roaming is fairly common with cellular phones, where a user may have a plan with a local cellular phone service, but when traveling must utilize another company's service in order to use the same cell phone. The local cellular phone service normally has agreements with cellular phone services throughout the country to provide access. This type of roaming may also be utilized for ISPs. Centralizing a database of user records may be difficult or impossible because of the security concerns about giving more than one ISP access to a particular user's record. The same security concern exists for having local databases containing the entire database of user records.

Accordingly, a need exists for a solution that allows for roaming capabilities, but which limits the bandwidth consumption normally encountered with current solutions.

BRIEF DESCRIPTION OF THE INVENTION

A method is described for handling access requests at multiple PoPs using the sharing of NAS information between the PoPs, enabling each PoP to maintain its own, independent, database of user records. When an access request is received, it is forwarded to a specific PoP designated as the user's "home PoP". This home PoP is the only PoP to contain the user's records. The home PoP may then handle the access request by utilizing a local NAS list, the local NAS list being synchronized with other NAS lists in the network and providing information on all the "known" NASes throughout the entire network. This allows for a user to roam between PoPs, while reducing the bandwidth and security concerns that have existed in the past when users chose to roam. The NAS lists may then be updated via a central Network Control Console.

DETAILED DESCRIPTION OF A PREFERRED EMBODIMENT

In the following description, a presently preferred embodiment of the invention is described with regard to preferred process steps and data structures. However, those skilled in the art would recognize, after perusal of this application, that embodiments of the invention may be implemented using at least one general purpose computer operating under program control, and that modification of the general purpose computer to implement the components, process steps, and/or data structures described herein would not require undue invention.

In accordance with a presently preferred embodiment of the present invention, the components, process steps, and/or data structures are implemented using a Network Control Console (NCC) and Protocol Gateways (PGWs). One of ordinary skill in the art will recognize, however, that the present invention is not limited to embodiments containing either an NCC or a PGW.

Figure 3:
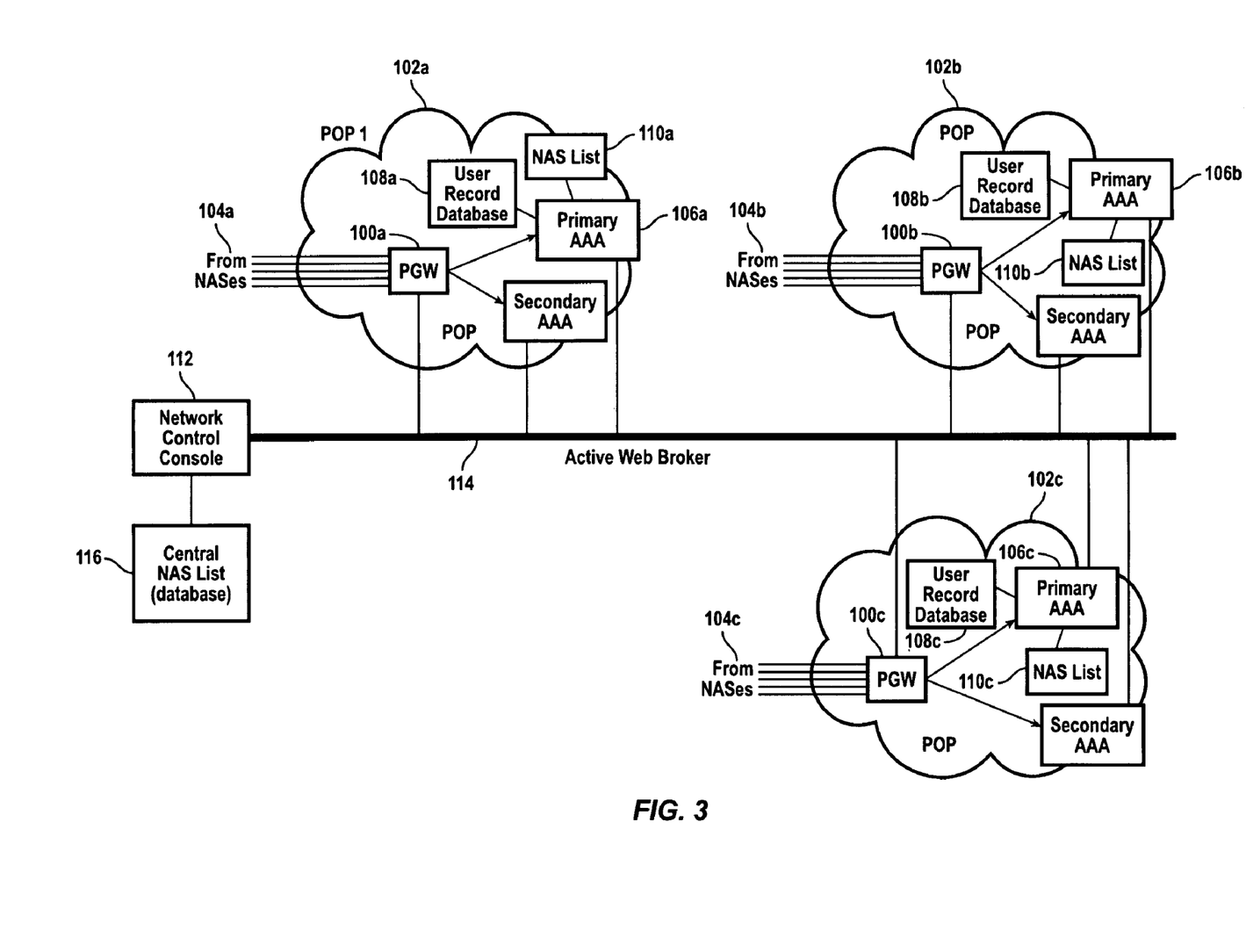
FIG. 3 is a block diagram of a communications system in a distributed AAA environment in accordance with a presently preferred embodiment of the present invention.

FIG. 3 is a block diagram of a communications system in a distributed AAA environment in accordance with a presently preferred embodiment of the present invention. Protocol Gateways 100a, 100b, 100c are located at each of the PoPs 102a, 102b, 102c. A Protocol Gateway (PGW) is a device which combines certain features of a gateway with that of a router, thus creating a "smart" gateway. In a presently preferred embodiment of the present invention, a PGW is placed between the NASes 104a, 104b, 104c and the AAA servers 106a, 106b, 106c at each PoP 102a, 102b, 102c. The PGWs then direct the traffic to and from the Internet.

In the present invention, rather than having local databases storing user records for the entire system, local user record databases 108a, 108b, 108c will store only the user records relating to the particular PoP. Generally, users have a single PoP that they access most frequently. This PoP will be referred to throughout this document as the user's "home PoP". One of ordinary skill in the art will recognize that any PoP can be chosen as a user's "home PoP", but if the one chosen also happens to be the one that is the most frequently accessed by the user or likeliest to be accessed by the user, it will result in a much more efficient system. Therefore, each PoP's local user record database 108a, 108b, 108c will only contain user records of users who have that PoP as their home PoP.

Thus, a user who lives in San Jose, Calif., will have the San Jose, Calif. PoP as his "home PoP". His user record will be contained only in a local database corresponding to the San Jose PoP. If the user dials into the San Jose PoP, the AAA services will be easy to perform since his user record is already contained at that location. However, if the user dials in from a different location (roams) then the AAA services become much harder.

In order to remedy this problem, a NAS list 110a, 110b, 110c is provided at each PoP. The primary concern with a user accessing the network via a foreign PoP is that the NAS utilized will not be a valid one. Therefore, the NAS list 110a, 110b, 110c at each location will contain a list of all valid NASes. While this still necessitates centralized management and synchronization much in the same way that the old method of storing a complete list of user records at each PoP did, in reality any bandwidth problems will be minimal. Records of valid NASes, unlike user records, are not updated all that frequently. It is a somewhat rare occurrence to add a new NAS, delete an old NAS, or change the settings of a NAS. Therefore, the synchronization of the NAS information throughout all of the NAS lists will not consume much bandwidth at all, as opposed to the synchronization of user records.

The NAS information may be centrally managed from a Network Control Console (NCC) 112. An NCC is generally a graphical interface that allows a user to configure PoPs, servers and services, monitor their activity and performance, and view messages sent between these objects for troubleshooting purposes. In a presently preferred embodiment of the present invention, the NCC may also be utilized to add NASes, remove NASes, and change NAS information in the local NAS lists throughout the network. The NCC may be connected to all the PGWs and AAA servers via an ActiveWeb Communication broker 114, which handles the broadcasting of any changes to the NAS lists throughout the network. ActiveWeb is an information broker in a suite of products called ActiveWorks, made by Active Software of Santa Clara, Calif. It provides a quick and effective way to distribute information throughout a computer network. One of ordinary skill in the art will recognize, however, that the distribution of such information in the present invention may be performed in a variety of ways and with a variety of different brokers.

In order to interface with this broker, each AAA server may have an agent, in a preferred embodiment this may be a CiscoSecure Information Bus Interface (CSII) which is hooked to the ActiveWeb Communication broker 114. A Master NAS List 116 may be centrally stored for reference in the NCC.

Whenever a change is made to the Central NAS list 116, such as the addition, deletion, or modification of a NAS entry, the NCC 112 publishes a broker event via the ActiveWeb Communication broker 114. In a preferred embodiment of the present invention, the broker event is NCPMONITOR:: KnownClients and takes the following form:

```
event KnownClients {
    timeToLive 0
    storageType Volatile
    string guidSource
    struct[ ] {
        string ClientIP
        string SharedSecret
        string AuthPrefix
        string VendorName
        string Desc
        string Location
    } seqClientList
```

All the protocol gateways and CSII servers subscribe to this event. Upon receipt of the event, the protocol gateways and CSII servers update the local NAS lists. The NAS lists are therefore dynamically re-configurable. Changes to the lists are propagated to all protocol gateways and AAA servers, and take effect without having to restart or reset any protocol gateway or AAA server.

Figure 4:
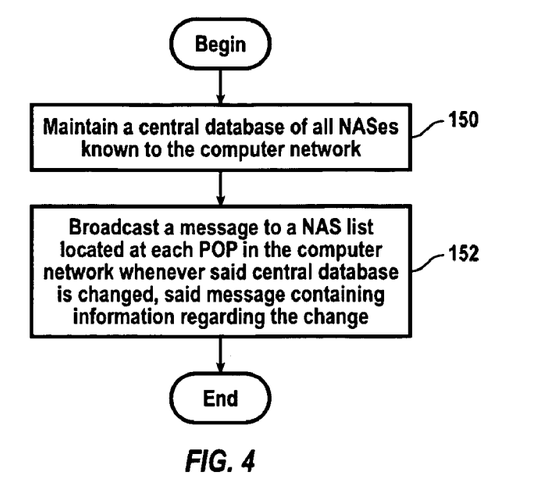
FIG. 4 is a flow diagram illustrating a method for centrally managing a computer network in accordance with a presently preferred embodiment of the present invention.

FIG. 4 is a flow diagram illustrating a method for centrally managing a computer network in accordance with a presently preferred embodiment of the present invention. At 150, a central database of all NASes known to the computer network is maintained. The known NASes will generally be ones that have been chosen by the ISP as being known. There is not necessarily a fixed way to define what is a known NAS. An ISP may be testing a new NAS and may hook it up to the network where it is accessible, but still choose to keep it off of its "known NAS" list until it is fully tested. The maintaining of the central database may be performed by a Network Control Console, which, as discussed earlier, is a graphic interface for the adding, deletion, and modification of NAS entries. At 152, a message is broadcast to a NAS list located at each POP in the computer network whenever said central database is changed, said message containing information regarding the change. This broadcasting may be performed automatically using a broker event by a broker whenever a change to the central database is made.

Figure 5:
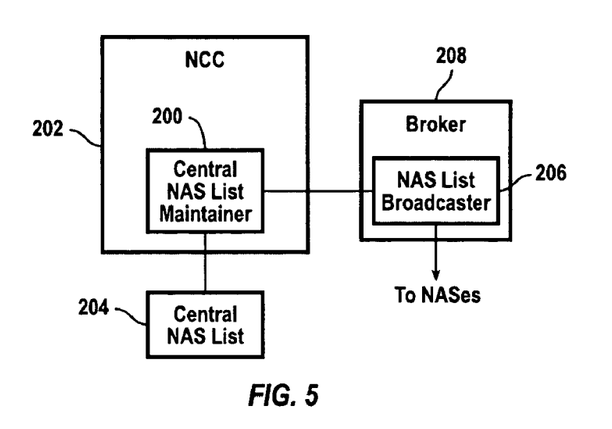
FIG. 5 is a block diagram illustrating an apparatus for centrally managing a computer network in accordance with a presently preferred embodiment of the present invention.

FIG. 5 is a block diagram illustrating an apparatus for centrally managing a computer network in accordance with a presently preferred embodiment of the present invention. A central NAS list maintainer 200, contained within a Network Control Console 202 in a presently preferred embodiment of the present invention, is coupled to a central NAS list 204. The central NAS list maintainer 200 maintains the central NAS list containing entries for all the NASes known to the computer network. A NAS list broadcaster 206 is coupled to said central NAS list maintainer 200 and broadcasts a message to a NAS list located at each POP in the computer network whenever said central database is changed, said message containing information regarding the change. This broadcasting may be performed automatically using a broker event by a broker 208 whenever a change to the central database is made.

Figure 6:
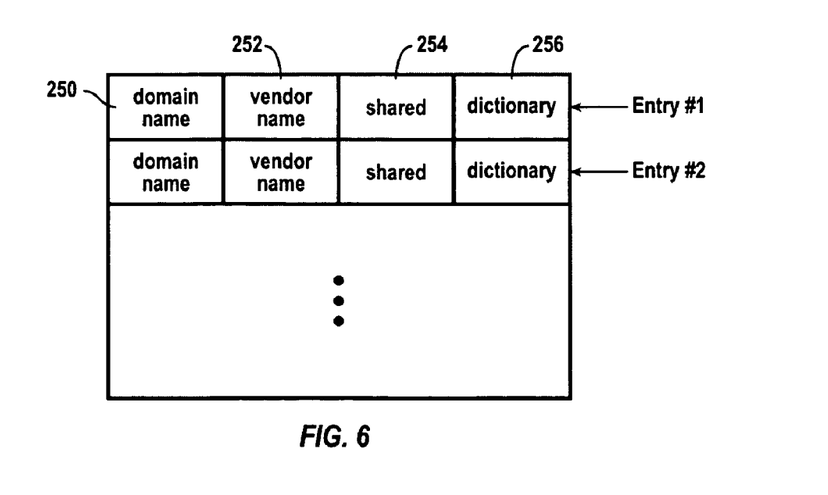
FIG. 6 is a diagram illustrating a NAS list in accordance with a presently preferred embodiment of the present invention.

At each PoP, the updated NAS list may be used to locally process access requests received from other PoPs. FIG. 6 is a diagram illustrating a NAS list in accordance with a presently preferred embodiment of the present invention. Each entry in the NAS list contains several fields. A Domain Name field 250 may contain the domain name of the corresponding NAS, which then could be resolved using a DNS server to get the IP address of the corresponding NAS, should it be necessary. A Vendor Name field 252 may contain the vendor name of the corresponding NAS, which may be used in determining how to handle the access request or how to handle access when it is granted. A Shared Secret field 254 may contain a secret, generally in the form of a password, which is shared between all authorized AAA servers and NASes in the network. This secret may then be used to authenticate a NAS when an access request is received, to ensure that the access request was not generated by an invalid NAS who simply appears to be sending the request from an authorized domain name. A dictionary field 256 may contain the name of an attribute dictionary for the corresponding NAS. In the presently preferred embodiment of the present invention, the attribute dictionary is a RADIUS dictionary. A set of standard RADIUS dictionaries may be programmed into the AAA server, and the entry in the dictionary field 256 may inform the AAA server which of these standard RADIUS dictionaries the corresponding NAS uses.

When the AAA server at the PoP receives an access request from a NAS at a different PoP, it may then access the NAS list to validate the NAS. This may include comparing the domain name the access request was received from with the domain name field 250 of all the entries of the NAS list until a match is found. The Shared Secret field 254 may also be used to further ensure security before granting the access request. Once the security issues are dealt with to the AAA server's satisfaction, it may grant the access request. Should the domain name of the access request not be found in the NAS list, or should the AAA server determine that all the security issues were properly dealt with, it would most likely refuse the access request.

Once the access request is granted, the AAA server may then proceed to authenticate the user and provide access to the network. This generally will involve accessing the user record database, which now will contain only the user records for users who claim this PoP to be their "home PoP". As discussed earlier, the determination as to which PoP is the user's home PoP can be made in many different ways. Generally, it would be assigned by an ISP based on the geographic location of the user's home or work address, as that is the most likely place a user would be attempting to log in from.

Figure 7:
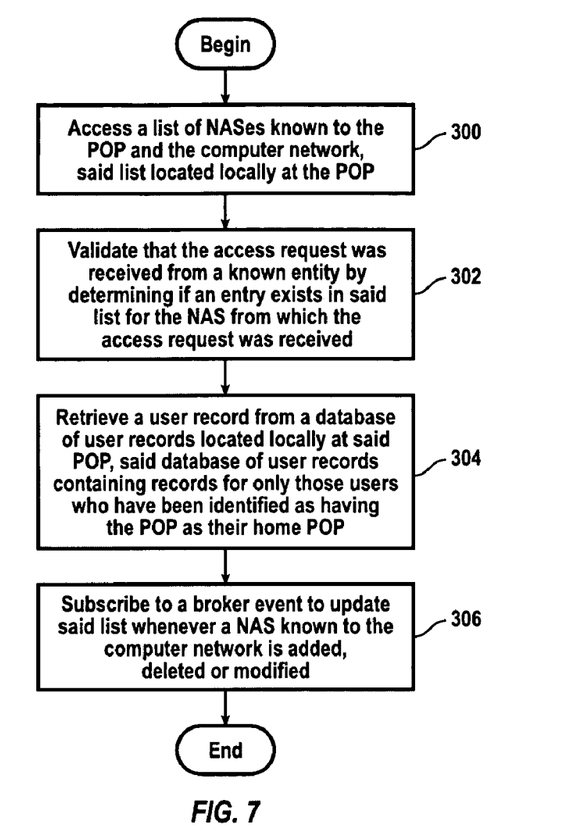
FIG. 7 is a flow diagram illustrating a method for locally processing an access request at a Point-of-Presence (PoP) in accordance with a presently preferred embodiment of the present invention.

FIG. 7 is a flow diagram illustrating a method for locally processing an access request at a Point-of-Presence (PoP) in a computer network having other PoPs, said access request received from a NAS network in accordance with a presently preferred embodiment of the present invention. At 300, the local AAA server accesses a list of network access servers (NASes) known to the PoP and the computer network, said list located locally at the PoP. At 302, the AAA server validates that said access request was received from a known entity by determining if an entry exists in said list for the NAS from which the access request was received. The validating, as discussed earlier, may include determining if the domain name that the access request was received from matches the domain name field of any entry in said list as well as examining whether a password supplied with the access request matches the shared secret field of a corresponding entry if a matching entry is found. At 304, the AAA server retrieves a user record from a database of user records located locally at said PoP, said database of user records containing records for only those users who have been identified as having the PoP as their home PoP. Then, at 306, the AAA server subscribes to a broker event to update the list whenever a NAS known to the computer network is added, deleted, or modified. This may be performed independently and/or by a completely different component of the network than 300, 302, and 304.

Figure 8:
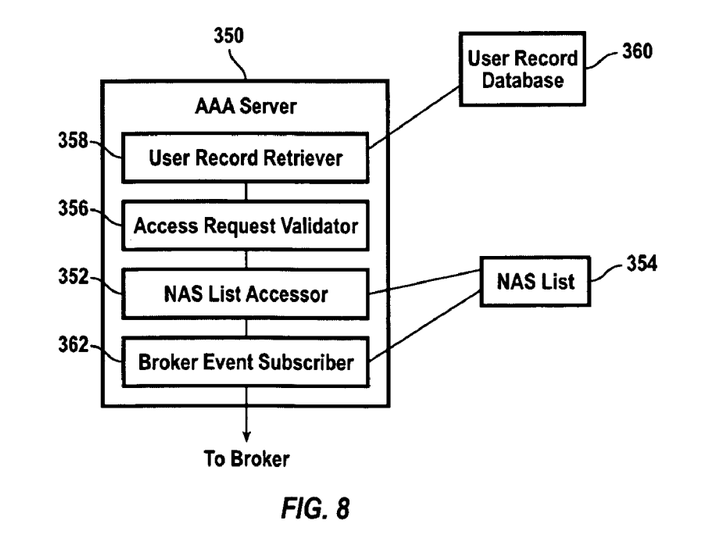
FIG. 8 is a block diagram of an apparatus for locally processing an access request at a Point-of-Presence (PoP) in accordance with a presently preferred embodiment of the present invention.

FIG. 8 is a block diagram of an apparatus for locally processing an access request at a Point-of-Presence (PoP) in a computer network having other PoPs, said access request received from a NAS network in accordance with a presently preferred embodiment of the present invention. An AAA server 350 may perform many of the functions described, but it is not required. A NAS list accessor 352 may be coupled to a NAS list 354 and access the NAS list 354. The NAS list 354 contains a list of NASes known to the PoP and the computer network and is located locally at the PoP. An access request validator 356 may be coupled to said NAS list accessor 352 and validate that said access request was received from a known entity by determining if an entry exists in said list for the NAS from which the access request was received. The validating, as discussed earlier, may include determining if the domain name that the access request was received from matches the domain name field of any entry in said list as well as examining whether a password supplied with the access request matches the shared secret field of a corresponding entry if a matching entry is found. A user record retriever 358 may be coupled to a user record database 360 and may retrieve a user record from the database 360, the database located locally at said PoP and containing records for only those users who have been identified as having the PoP as their home PoP. A broker event subscriber 362 may also be coupled to the NAS list 354 then subscribe to a broker event to update the NAS list whenever a NAS known to the computer network is added, deleted, or modified.

From the perspective of the PoP that the user logs into, an access request must be generated and sent to the user's home PoP, as only the user's home PoP has access to the user record, which is needed to properly authenticate the user and to run the session (as it may contain such information as the user's password and the level of access he enjoys or time limits he must abide by). At this stage, however, the PoP may not have an indication of which is the user's home PoP. This determination is generally made by the protocol gateway, however other devices in the PoP could also perform this task, such as the NAS. How this is performed may depend on whether or not the user is attempting to "roam" within a single ISP, or between two separate ISPs. The most common way either is done is by simply examining the user name that is entered by the user. When the user is roaming between ISPs, it may be necessary for the user to enter a complete user name which includes a domain name. For example, if the domain name of the user's ISP is "isp.com", when logging directly into the home PoP of that ISP, the user may simply enter "username". However, if roaming from another ISP, the user must enter "username@isp.com". This information is then used to determine where to send the access request.

If "isp.com" has multiple PoPs under its control, additional information may need to be provided, such as the user indicating which PoP is their home PoP by entering their home city, perhaps as a prefix, such as entering "sanjose/username@isp.com" as the username, indicating that the user's home PoP is maintained by "isp.com" and is located in San Jose. (as opposed to, perhaps, a Los Angeles PoP maintained by "isp.com"). This same type of switch may be utilized when "roaming" within the same ISP, however in that case the domain name need not be entered, so the user name may look like "sanjose/username".

The Protocol Gateway may also have domain to AAA server IP address mapping information which may be sent from the NCC. This can be used to relay the access request to the precise AAA server within the domain, rather than simply relaying it to the IP address in the DNS record for that domain.

Another potential solution is to simply have different domains for different home PoPs within an ISP's control, such as "isp-sj.com" for the San Jose location and "isp-la.com" for the Los Angeles location.

Figure 9:
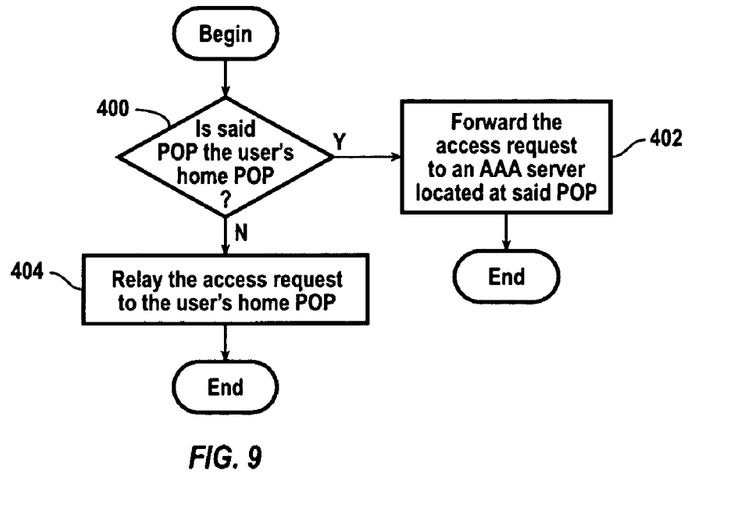
FIG. 9 is a flow diagram illustrating a method for handling an access request at a PoP, said access request generated by a user logging on to said PoP, said user having a home PoP in accordance with a presently preferred embodiment of the present invention.

FIG. 9 is a flow diagram illustrating a method for handling an access request at a PoP, said access request generated by a user logging on to said PoP, said user having a home PoP in accordance with a presently preferred embodiment of the present invention. At 400, a protocol gateway or other device determines if said user's home PoP is said PoP. As discussed earlier, the precise mechanism for performing this may depend on how the roaming features are designed in the network. At 402, the access request is forwarded to an AAA server located at said PoP if said user's home PoP is said PoP. This is done when the user has dialed directly into the home PoP and is a relatively simple case. At 404, the access request is relayed to said user's home PoP if said user's home PoP is not said PoP.

Figure 10:
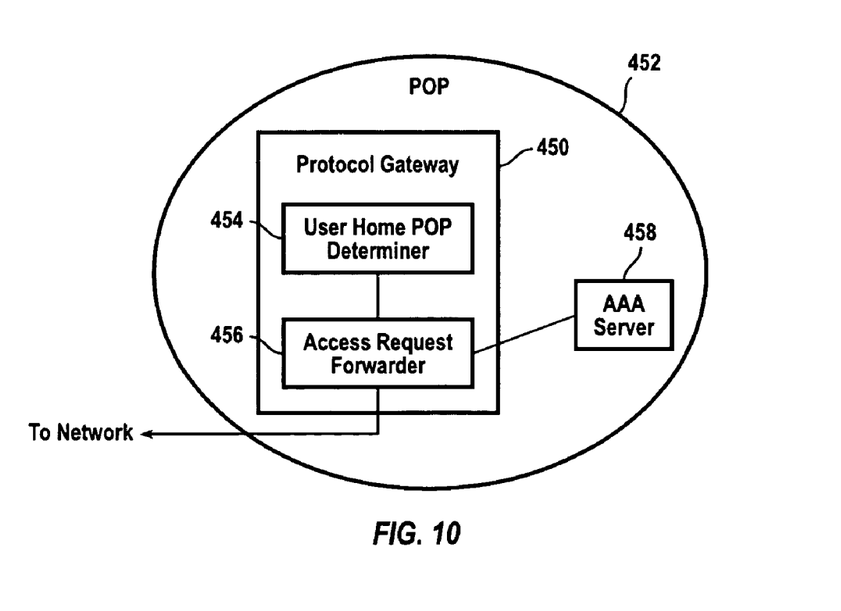
FIG. 10 is a block diagram illustrating a method for handling an access request at a PoP, said access request generated by a user logging on to said PoP, said user having a home PoP in accordance with a presently preferred embodiment of the present invention.

FIG. 10 is a block diagram illustrating an apparatus for handling an access request at a PoP, said access request generated by a user logging on to said PoP, said user having a home PoP in accordance with a presently preferred embodiment of the present invention. Protocol gateway 450 located at the PoP 452 may contain the components described herein. A user home PoP determiner 454 determines if said user's home PoP is said PoP. As discussed earlier, the precise mechanism for performing this may depend on how the roaming features are designed in the network. An access request forwarder 456 coupled to said user home PoP determiner 454 and to an AAA server 458 located at said PoP forwards the access request to the AAA server if said user's home PoP is said PoP. This is done when the user has dialed directly into the home PoP and is a relatively simple case. The access request forwarder 456 is also coupled to the network and relays the access request to said user's home PoP if said user's home PoP is not said PoP.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for providing roaming capabilities to a user in a computer network having two or more Points-of-Presence (PoPs), wherein one of the PoPs is designated as the user's home PoP, the method comprising:

maintaining a network access servers (NAS) list at the user's home PoP; and periodically transferring the NAS list from the user's home PoP to a central database, for updating of the central database of all NASes known to the computer network and subsequent update of the two or more PoPs, such that a current version of the central database of all NASes known to the computer network is maintained at each of the two or more PoPs.

2. The method of claim 1, further comprising:

receiving an access request at one of the PoPs; and validating that the access request was received from a known entity by determining if an entry exists in the current version of the central database maintained at the one of the PoPs.

3. The method of claim 2, wherein the each entry in the current version of the central database of all NASes known to the computer network contains fields for:
- a domain name of a NAS;
- a vendor name of the NAS;
- a shared secret between all known NASes and AAA servers in the network; and
- a dictionary name, the dictionary name indicating a dictionary of attributes supported by the NAS.

4. The method of claim 3, wherein the validating further includes validating that the access request was received from a known entity by determining if the domain name that the access request was received from matches the domain name field of any entry in the list.

5. The method of claim 4, wherein the validating further includes examining whether a password supplied with the access request matches the shared secret field of a corresponding entry in the list if the domain name that the access request was received from matches the domain name field of any entry in the list.

6. The method of claim 3, wherein the dictionary of attributes is a standard RADIUS dictionary.

7. The method of claim 1, wherein the periodically transferring includes subscribing to a broker event.

8. An apparatus for providing roaming capabilities to a user in a computer network having two or more Points-of-Presence (PoPs), wherein one of the PoPs is designated as the user's home PoP, the apparatus comprising:
- a NAS list maintenance module configured to maintain a network access servers (NAS) list at the user's home PoP; and
- a NAS list transfer module coupled to the NAS list maintenance module and configured to periodically transfer the NAS list from the user's home PoP to a central database, for updating of the central database of all NASes known to the computer network and subsequent update of the two or more PoPs, such that a current version of the central database of all NASes known to the computer network is maintained at each of said the or more PoPs.

9. The apparatus of claim 8, further comprising:
- an access request receiving module configured to receive an access request at one of the PoPs; and
- an access request validator coupled to the access request receiving module.

10. The apparatus of claim 9, wherein the each entry in the current version of the central database of all NASes known to the computer network contains fields for:
- a domain name of a NAS;
- a vendor name of the NAS;
- a shared secret between all known NASes and AAA servers in the network; and
- a dictionary name, the dictionary name indicating a dictionary of attributes supported by the NAS.

11. The apparatus of claim 10, wherein the access request validator is configured to validate that the access request was received from a known entity by determining if the domain name that the access request was received from matches the domain name field of any entry in the list.

12. The apparatus of claim 11, wherein the access request validator is configured to examine whether a password supplied with the access request matches the shared secret field of a corresponding entry in the list if the domain name that the access request was received from matches the domain name field of any entry in the list.

13. The apparatus of claim 10, wherein the dictionary of attributes is a standard RADIUS dictionary.

14. The apparatus of claim 8, wherein the NAS list transfer module is further configured to subscribe to a broker event.

15. An apparatus for providing roaming capabilities to a user in a computer network having two or more Points-of-Presence (PoPs), wherein one of the PoPs is designated as the user's home PoP, the apparatus comprising:
- means for maintaining a network access servers (NAS) list at the user's home PoP;
- means for periodically transferring the NAS list from the user's home PoP to a central database, for updating of the central database of all NASes known to the computer network and subsequent update of the two or more PoPs, such that a current version of the central database of all NASes known to the computer network is maintained at each of the two or more PoPs.

16. The apparatus of claim 15, further comprising:
- means for receiving an access request at one of the PoPs; and
- means for validating that the access request was received from a known entity by determining if an entry exists in the current version of the central database maintained at the one of the PoPs.

17. The apparatus of claim 16, wherein the each entry in the current version of the central database of all NASes known to the computer network contains fields for:
- a domain name of a NAS;
- a vendor name of the NAS;
- a shared secret between all known NASes and AAA servers in the network; and
- a dictionary name, the dictionary name indicating a dictionary of attributes supported by the NAS.

18. The apparatus of claim 17, wherein the means for validating further includes means for validating that the access request was received from a known entity by determining if the domain name that the access request was received from matches the domain name field of any entry in the list.

19. The apparatus of claim 17, wherein the means for validating further includes means for examining whether a password supplied with the access request matches the shared secret field of a corresponding entry in the list if the domain name that the access request was received from matches the domain name field of any entry in the list.

20. The apparatus of claim 17, wherein the dictionary of attributes is a standard RADIUS dictionary.

21. The apparatus of claim 15, wherein the means for periodically transferring includes means for subscribing to a broker event.

* * * * *